UNITED STATES PATENT OFFICE.

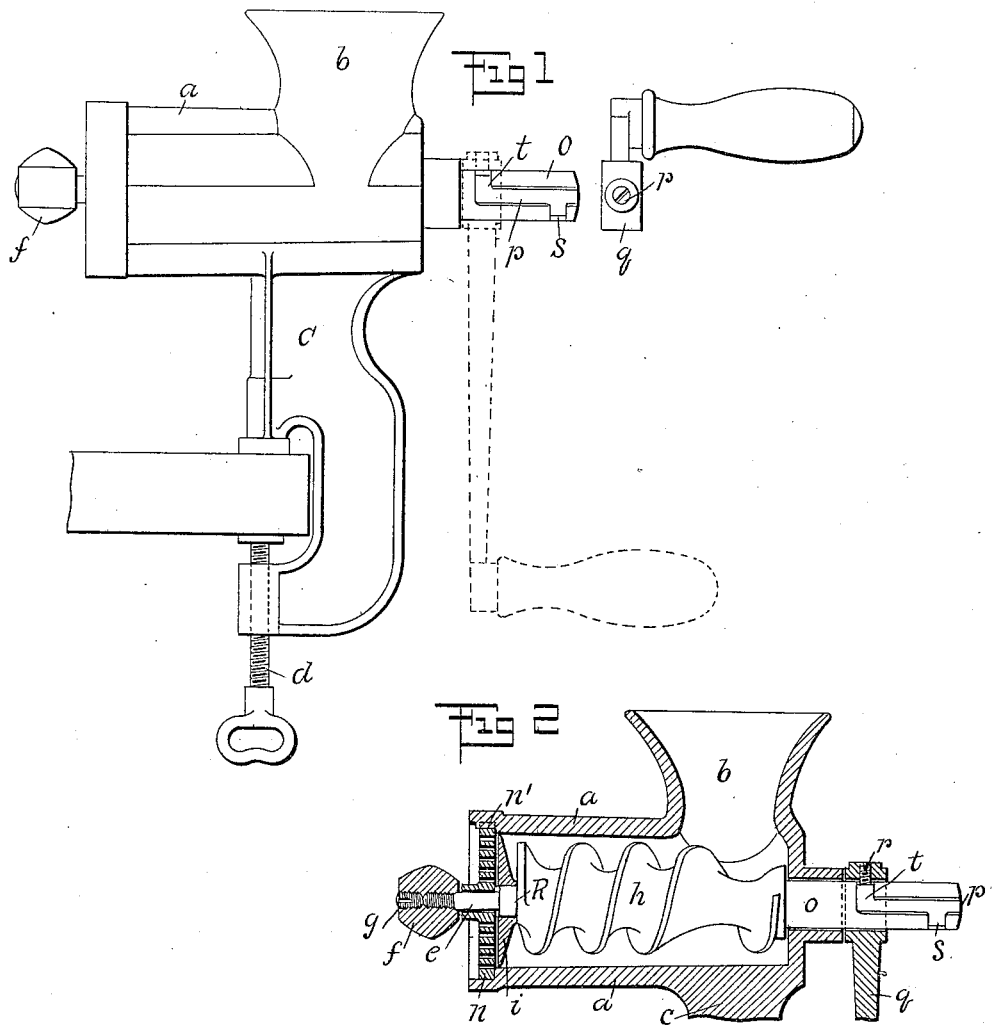

ALEXANDER KARNAT, OF BATEN, RUSSIA.

MEANS FOR SECURING CRANK-HANDLES.

1,095,880.  Specification of Letters Patent.  Patented May 5, 1914.

Application filed September 30, 1912. Serial No. 723,234.

*To all whom it may concern:*

Be it known that I, ALEXANDER KARNAT, a subject of the Emperor of Russia, and resident of Baten, Courland Government, Russia, have invented a new and Improved Means for Securing Crank-Handles, of which the following is a full, clear, and exact description.

This invention relates to meat choppers or other machines which involve a rotary feeding member operated by a hand crank and also including a knife or other operating element which is subject to becoming clogged by any material passing through the machine and which, for this reason, necessitates frequent adjustment for removing the obstacles.

More particularly stated, this invention relates to meat choppers and of the type in which there is a hollow body having at one end a disk held from rotation and a knife rotatable adjacent said disk, said knife being operated by or in unison with a screw or other means for feeding the material to be chopped along said hollow body into position to be engaged and acted upon by said knife and disk.

The object of this invention is to produce a meat chopper of the class above indicated which is adapted to be adjusted for inspection and a ready removal of strings or sinews which may gather upon the knife, simply by a longitudinal movement of the cutting or operating parts through the particular connection of the crank handle.

Another object of the invention is to so improve this class of devices as to simplify the construction and hence increase the sanitary nature thereof.

The foregoing and other objects of the invention will hereinafter be more fully described and claimed and illustrated in the drawing accompanying this specification in which like characters of reference indicate corresponding parts in all the views, and in which—

Figure 1 is a side elevation of one form of my invention, the handle being shown in full lines in position for application to the shank, and Fig. 2 is a vertical longitudinal section of the same, the handle being in operative position.

Referring to these figures and having in view particularly the broad features of the invention, I show at $a$ a machine body substantially tubular in form and having a mouth $b$ through which meat or other food products to be treated may be admitted into the interior of the body $a$. Said machine includes also a bracket $c$ of any suitable nature whereby it may be secured to any suitable stationary support as by means of a screw $d$. As is usual in this class of choppers, a feed screw $h$ is located within the body $a$ and serves to feed or force the meat received through the mouth $b$ toward the rear end of the casing or body. At the rear end of the screw is secured a spindle $e$ which extends through the disk $n$, said parts being removably held together for coöperation by means of a nut $f$ threaded upon the outer end of said spindle. The disk $n$ is movable longitudinally into and out of the rear end of the casing, but when in operative position is held from rotation therein by means of a lug $n'$. Adjacent the inner face of the disk is a knife $i$ mounted upon a polygonal portion R whereby, upon rotation of the screw $h$, the knife $i$ is caused to coöperate with the disk $n$ and by shearing effect will chop or cut the meat into small bits, as it is being forced through the holes in the disk by operation of the screw. The spindle $e$ constitutes a bearing support for one end of the screw in the disk and the other end of the screw has a shank $o$ to which the handle $q$ is removably secured by quickly detachable means.

The nut $f$ may be of any suitable form and is intended to be adjusted by hand so as to vary the tension between the knife $i$ and the disk $n$. To avoid any possibility of the nut being turned inadvertently too tight so as to cause the knife and spindle $e$ to bind upon the disk, I provide a plug $g$ which is screw threaded into the outer end of the nut and is so adjusted as to engage end for end with the spindle $e$ and thereby determine the extent of adjustment of the nut along said spindle. In other words, the plug $g$ by its threaded engagement with the nut may be set by a machinist or some other person sufficiently skilled to determine the degree of tightness for the knife to operate upon the disk. When once so adjusted, the plug will make it impossible for the ordinary user of the machine to make the knife too tight. It will be understood, however, that the plug may be subsequently adjusted, when necessary, to compensate for any wear which may take place between the knife and disk.

It will be noted that the nut $f$ in coöperation with the screw and spindle serves to lock the knife and disk to the spindle so that all of such operating parts may be moved together longitudinally and projected beyond the rear open end of the casing *a*. In order to accomplish this, the shank *o* is extended to an unusual extent forwardly beyond the front end of the casing and the handle *q* is connected thereto shiftably or adjustably so as to permit, by slight manipulation of the securing means, of the screw and cutting parts being moved rearwardly through the casing far enough to expose the knife and disk. Any cords, sinews or the like which may have gathered upon the knife may then be readily grasped and removed therefrom. In specifically carrying out this idea the shank *o* is provided at its forward end with a longitudinal groove *p* extending from the extreme end rearwardly. Said groove has one or more side grooves *t*, *s* into which a set screw *r* is adapted to extend and thereby hold the handle in either its inner or outer position of adjustment. The normal operative position of the handle in this form of the invention is as shown in Fig. 2, the handle being substantially against the outer end of the bearing of the casing in which the shank *o* operates. The handle, therefore, in this position constitutes an abutment counteracting any tendency of the operating parts to be displaced rearwardly through the rear end of the casing. When, however, it is desired to expose the cutting members, the handle and screw *r* may readily be shifted outwardly along the groove *p* and by dropping the same into the lateral groove *s* the handle will prevent the movable parts from projecting too far rearwardly and said groove *s* also will prevent an accidental fall of the handle from the shank.

The several parts of the improvement may be made of any suitable materials, and from what has been stated heretofore it will be understood that the relative sizes of the parts may be variously modified without departing from the spirit of the invention.

Having thus described my invention, I claim as new and desire to secure by Letters Patent:—

The combination of a rotary member having a shank provided with a longitudinal groove in its surface from one end, and with transversely extending grooves forming oppositely projecting branches of the longitudinal groove and located adjacent to its respectively opposite ends, and a handle having an aperture to receive the shank, and a stud projecting inwardly of the opening and adapted to engage within the shank grooves.

In testimony whereof, I have signed my name to this specification in the presence of two subscribing witnesses.

A. KARNAT.

Witnesses:
J. B. KARNAT,
B. HARMSENT.

---

Copies of this patent may be obtained for five cents each, by addressing the "Commissioner of Patents, Washington, D. C."